United States Patent

Mahnad

(10) Patent No.: US 8,811,131 B2
(45) Date of Patent: *Aug. 19, 2014

(54) SYSTEM AND METHOD FOR OFF-TRACK WRITE PREVENTION AND DATA RECOVERY IN MULTIPLE HEAD OPTICAL TAPE DRIVES

(71) Applicant: Oracle International Corporation, Redwood City, CA (US)

(72) Inventor: Faramarz Mahnad, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,884

(22) Filed: Oct. 10, 2013

(65) Prior Publication Data

US 2014/0036649 A1 Feb. 6, 2014

Related U.S. Application Data

(63) Continuation of application No. 13/563,952, filed on Aug. 1, 2012, now Pat. No. 8,582,224.

(51) Int. Cl.
*G11B 7/00* (2006.01)

(52) U.S. Cl.
USPC .................................. 369/44.26; 369/44.41

(58) Field of Classification Search
CPC combination set(s) only.
See application file for complete search history.

(56) References Cited

U.S. PATENT DOCUMENTS

| | | | |
|---|---|---|---|
| 4,554,652 A | 11/1985 | Maeda et al. | |
| 5,181,194 A | 1/1993 | Horie | |
| 6,058,092 A | 5/2000 | Masters et al. | |
| 7,362,529 B2 | 4/2008 | Chiao et al. | |
| 7,589,925 B1 | 9/2009 | Chiao et al. | |
| 8,125,862 B2 * | 2/2012 | Ross et al. | 369/44.41 |
| 8,427,912 B2 * | 4/2013 | Ostroverkhov et al. | 369/44.26 |
| 2005/0015653 A1 | 1/2005 | Hajji et al. | |
| 2006/0227445 A1 | 10/2006 | Chiao et al. | |
| 2007/0206477 A1 | 9/2007 | Raniuk et al. | |

FOREIGN PATENT DOCUMENTS

EP 0327090 8/1989

OTHER PUBLICATIONS

International Search Report and Written Opinion for PCT/US2013/053163 dated Nov. 6, 2013.

* cited by examiner

*Primary Examiner* — Van Chow
(74) *Attorney, Agent, or Firm* — Brooks Kushman P.C.

(57) ABSTRACT

In an optical tape drive having optical heads for writing data in tracks on an optical tape, each track having an off-track threshold, a system and method are disclosed for off-track write prevention. The system includes multiple actuators, each actuator configured to control a position of an associated optical heads. The system also includes a controller configured to determine a position of each of the optical heads relative to an associated track on the optical tape and to prevent, in response to an event causing an optical heads to have a position outside the off-track threshold of the associated track, only that optical head from writing data to the optical tape and to buffer a stream of data for that optical head for later processing.

14 Claims, 3 Drawing Sheets

SYSTEM AND METHOD FOR OFF-TRACK WRITE PREVENTION AND DATA RECOVERY IN MULTIPLE HEAD OPTICAL TAPE DRIVES

CROSS-REFERENCE TO RELATED APPLICATION

This application is a continuation of U.S. application Ser. No. 13/563,952 filed Aug. 1, 2012, now U.S. Pat. No. 8,582,24 issued Nov. 12, 2013, the disclosure of which is hereby incorporated in its entirety by reference herein.

TECHNICAL FIELD

The following relates to a system and method for off-track write prevention and data recovery in optical tape drives having multiple optical read and/or write heads.

BACKGROUND

Data storage tape devices with multiple heads generally utilize methodologies that rely on the limiting margins of the data track layout on the media to prevent off-track (OT) writing of data to the media. Such limiting margins determine OT thresholds, which are monitored by a servo subsystem of the tape device that controls the common motion of the multiple heads. Using such thresholds, the servo subsystem prevents the read/write channel of the device from writing data tracks too close to each other on the media. Writing of data to the media commences, continues or resumes only if and when the servo subsystem is capable of moving the recording heads within the allowed thresholds.

Present multiple head designs in these tape devices include a rigid body housing and actuating structure. As a result, in the event of excessive external disturbances to the heads or excessive instantaneous lateral motion of the tape media, all heads move away from the center of their corresponding tracks and beyond the OT threshold limits. In such circumstances, servo off-track functionality normally invokes the buffering of data streaming to the heads and prevents the heads from processing and recording that streaming data on the tape media until all heads are moved back to within their OT threshold limits.

Tape devices with very high track densities, such as optical tape drives, inherently have extreme and stringent requirements on off-track threshold margins and limits. As a result, the performance limitations described above resulting from excessive external disturbances to the heads or excessive instantaneous tape lateral motion can have significant adverse impact on data capacity and transfer rate of such tape devices.

Thus, there exists a need for an improved system and method for off-track write prevention and data recovery in an optical tape drive having multiple optical heads. Such a system and method would overcome performance limitations associated with excessive external disturbances to optical heads or excessive instantaneous tape lateral motion to provide greater data transfer rates overall and increased data capacity.

SUMMARY

According to one embodiment disclosed herein, in an optical tape drive comprising a plurality of optical heads for writing data in a plurality of tracks on an optical tape, each track having an off-track threshold, a system is provided for off-track write prevention. The system comprises a plurality of actuators, each actuator configured to control a position of one of the plurality of optical heads associated therewith. The system also comprises a controller configured to determine a position of each of the optical heads relative to an associated track on the optical tape and to prevent, in response to an event causing at least one of the plurality of optical heads to have a position outside the off-track threshold of the associated track, only the at least one optical head from writing data to the optical tape and to buffer a stream of data for the at least one optical head for later processing.

According to another embodiment disclosed herein, in an optical tape drive comprising a plurality of optical heads for reading data from a plurality of tracks on an optical tape, each track having an off-track threshold, a system is provided for off-track data recovery. The system comprises a plurality of actuators, each actuator configured to control a position of one of the plurality of optical heads associated therewith. The system also comprises a controller configured to determine a position of each of the optical heads relative to an associated track on the optical tape and to permit, in response to an event causing at least one of the plurality of optical heads to have a position outside the off-track threshold of the associated track, the at least one optical head to stream data read from the optical tape when a loss of data from the at least one head is correctable.

According to still another embodiment disclosed herein, in an optical tape drive comprising a plurality of optical heads for writing data in a plurality of tracks on an optical tape, each track having an off-track threshold, a method is provided for off-track write prevention. The method comprises controlling the plurality of optical heads via a plurality of actuators, each actuator configured to control a position of one of the plurality of optical heads associated therewith, and determining a position of each of the optical heads relative to an associated track on the optical tape. The method also comprises preventing, in response to an event causing at least one of the plurality of optical heads to have a position outside the off-track threshold of the associated track, only the at least one optical head from writing data to the optical tape.

A detailed description of these embodiments and accompanying drawings is set forth below.

BRIEF DESCRIPTION OF THE DRAWINGS

FIG. 1a is a perspective view of a portion of an optical tape drive system with multiple optical heads and a common servo subsystem actuator;

FIG. 1b is a magnified view of the portion of the optical tape drive system of FIG. 1a;

DETAILED DESCRIPTION

Figure 1:
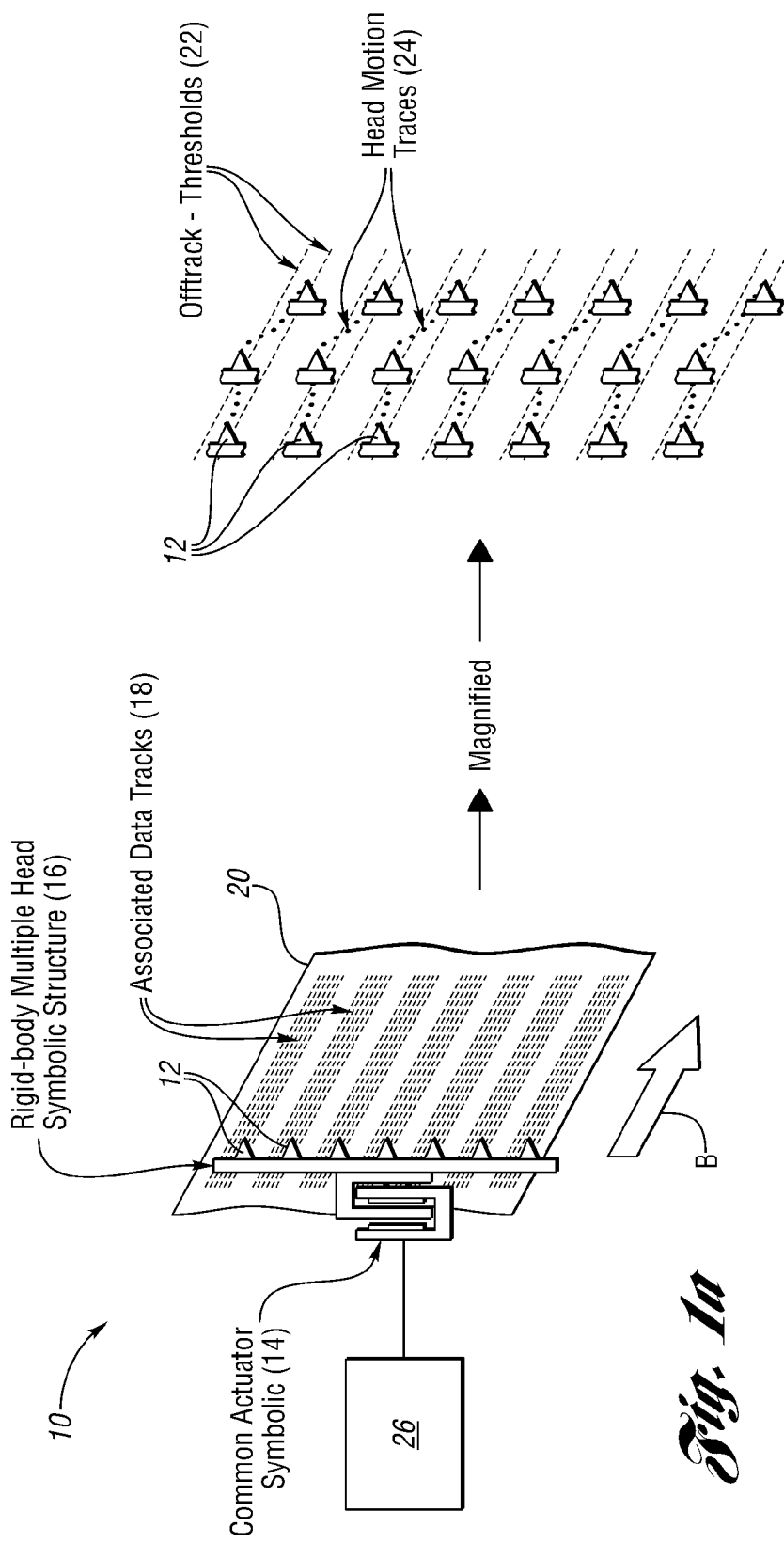

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1a-4, a system and method for off-track write prevention and data recovery in an optical tape drive with multiple optical heads will be described. For ease of illustration and to facilitate understanding, like reference numerals have been used herein for similar components and features throughout the drawings.

As previously discussed, data storage tape devices with multiple heads generally utilize an "Off Track Write" prevention methodology based on off-track boundary thresholds determined by the limiting margins of the data track layouts on the media. These thresholds, monitored by the device servo subsystem that controls the common motion of multiple heads, prevent the device read/write channel from writing data tracks too close to each other. If and when the servo system is capable of moving the recording heads within the allowed thresholds, then the writing of the data is resumed.

Referring now to FIG. 1a, a perspective view is shown of a portion of an optical tape drive system (10) with multiple optical heads (12) and a common servo subsystem actuator (14). It should be noted here that the heads (12) and actuator (14) are depicted symbolically for ease of illustration. As seen in FIG. 1a, the multiple head design of the optical tape device (10) include a rigid body housing (16) and actuating structure (14). As also seen therein, each of the multiple heads (12) function to write data to (and/or read data from) an associated data track (18) on the tape media (20). In that regard, the common actuator (14) moves the plurality of multiple optical heads (12) together in response to control signals from a controller (26).

FIG. 1b is a magnified view of the portion of the optical tape drive system (10) of FIG. 1a. As seen therein, each data track (18) on the tape media (20) includes off-track thresholds (22). As previously described, the thresholds (22) define limits within which the multiple heads (12) are to write data to the data tracks (18) of the tape media (20).

However, as a result of the rigid body housing (16) and actuator (14), excessive external disturbances to the heads (12) or excessive instantaneous lateral motion of the tape media (20) causes all heads (12) to move in unison away from the center of their corresponding tracks (18) and beyond the OT threshold limits (22), as illustrated in Figure 1b by the motion traces (24) showing various positions of the heads (12) over a period of time. In that event, servo off-track functionality normally invokes the buffering of data streaming to the heads (12) and prevents the heads (12) from processing and recording that streaming data to the data tracks (18) of the tape media (20) until all heads (12) are moved back to within their OT threshold limits (22).

As previously described, tape devices with very high track densities, such as optical tape drives, inherently have extreme and stringent requirements on off-track threshold margins and limits. As a result, the performance limitations described above resulting from excessive external disturbances to the heads or excessive instantaneous tape lateral motion can have significant adverse impact on data capacity and transfer rate of such tape devices. Thus, there exists a need for an improved system and method for off-track write prevention and data recovery in an optical tape drive having multiple optical heads. Such a system and method would overcome performance limitations described above to provide greater data transfer rates overall and increased data capacity.

Figure 2:
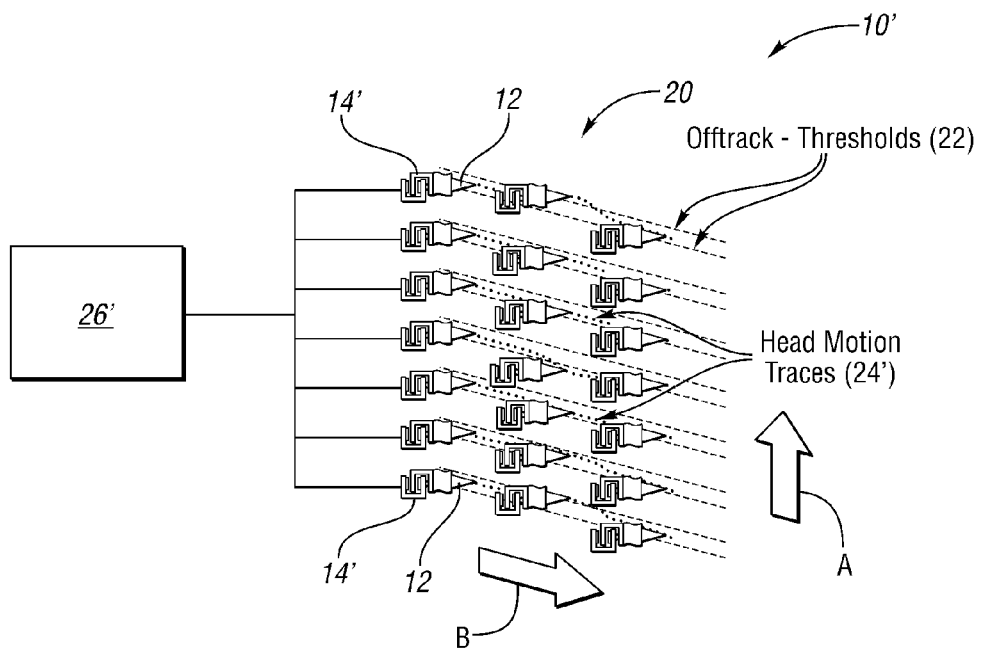
FIG. 2 is a perspective view of a portion of an optical tape drive system with multiple optical heads and multiple individual head actuators, and including an embodiment of a system for off-track write prevention as described herein.

Referring now to FIG. 2, a perspective view is shown of a portion of an optical tape drive system (10') with multiple optical heads (12) and multiple individual head actuators (14'), and including an embodiment of a system for off-track write prevention. Once again, it should be noted that the heads (12) and actuators (14') are depicted symbolically for ease of illustration, and that any type of optical heads and/or actuator may be employed in connection with the various embodiments of the system and method described herein.

FIG. 2 illustrates a multiple head data recording system (10'), where each recoding head (12) has an independent actuating structure (14') associated therewith. The individual actuating structures (14') may be controlled by control signals from a controller (26'). Alternative, the actuating structures (14') may be controlled by control signals from associated dedicated controllers or control systems (not shown). In that regard, it should be noted that the controller (26') may comprise any number or type of components, such as an appropriately programmed microprocessor or any other type of hardware, software or combination thereof.

The system and method described herein for optical tape drives provide improved detection and prevention of Off-Track data processing. According to the various embodiments of such a system and method, because of the independent motion of the recording heads (12), in the event of an excessive external disturbance to the system (10') or excessive instantaneous substantially lateral motion of the tape media (20) (such as in the direction of the arrow (A) shown in FIG. 2), only a subset of the total number of heads (12) may move outside the Off-Track limits (22).

This is illustrated in FIG. 2 by the motion traces (24') showing various positions of the heads (12) over a period of time in response to an event (e.g., excessive external disturbance to the system (10') or excessive instantaneous substantially lateral motion of the tape media (20)). As seen therein, during that time period, some of the heads (12) remain within the OT limits (22) of their associated data tracks (18), while other heads (12) move outside associated OT limits (22).

The system and method described herein provide for off-track data processing in cases associated with a write data process, a read data process, and data recover in catastrophic failure conditions. More particularly, according to the system and method described herein, in a write data process, only the heads outside the threshold limits are prevented from writing data on their associated tracks, and associated data is buffered for later processing. The device transfer rate and the media capacity are therefore only marginally impacted, as compared to the case where all heads are disabled for a period of time and all data is written later. Moreover, according to the system and method described herein, for steaming data, a smaller buffer size and a lower number of sequential flushing (stopping the input streaming data) are required, thereby providing for an improved data transfer rate and greater media capacity.

In the case of a read data process, once again, only the heads outside the associated OT thresholds are incapable of retrieving data. If the distributed Error Correction Code (ECC) design in the devices is capable of correcting the loss of data from the subset of heads momentarily outside the OT thresholds, then streaming data retrieval may continue without the need for rewinding the tape. This provides greatly enhanced performance compared to the case where all data from all heads are irretrievable for a given period of time.

In the case of data recovery in catastrophic failure conditions, because the system and method described herein provide functional independence of the heads in the optical tape drive, previously written data may still be recovered in the event of one or more head failures and/or media defects.

Figure 3:
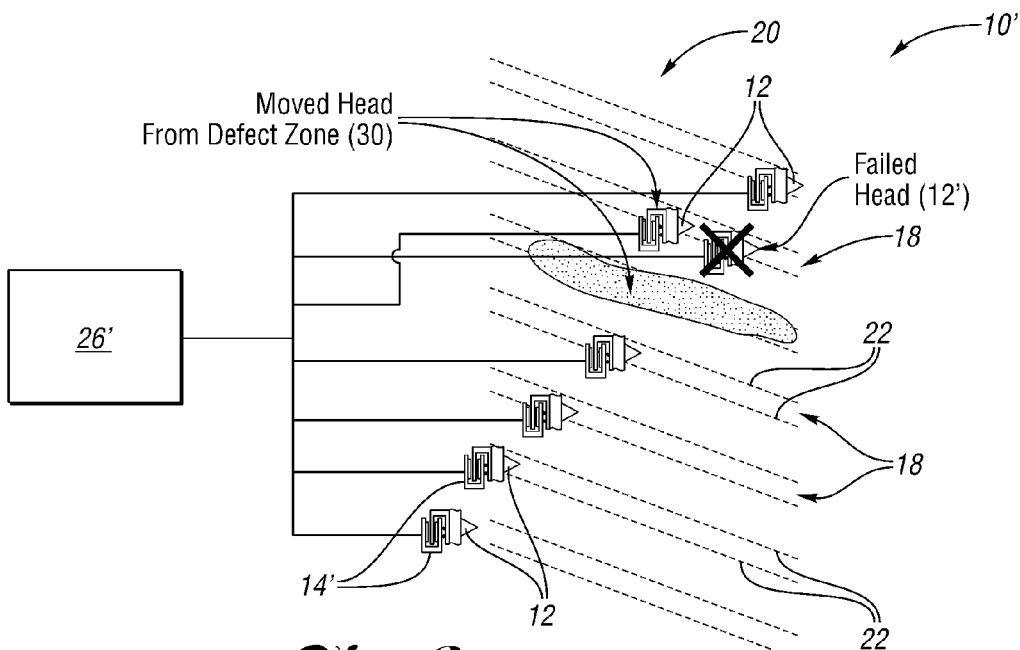
FIG. 3 is a perspective view of a portion of an optical tape drive system with multiple optical heads and multiple individual head actuators, and including an embodiment of a system for data recovery as described herein.

Referring now to FIG. 3, a perspective view is shown of a portion of an optical tape drive system with multiple optical heads and multiple individual head actuators, and including an embodiment of a system for data recovery as described herein.

More specifically, as seen in FIG. 3, any head or number of heads (12) may be moved from designated but defective media tracks and/or zone areas (30) to other tracks and/or zones (18), including a track and/or zone of a detected failed head (12'). This approach is especially useful in the event that all the allowable number of heads recoverable by the channel ECC have failed, and any defect in the zones of remaining operative heads would normally results in unrecoverable read failure. In such am event, according to the system and method described herein, the head or heads (12) from the defective area zones (30) may be moved to the zones (18) of failed heads (12') such that, by the help of the channel ECC, the data may still be recovered under an otherwise catastrophic failure condition.

With continuing reference to FIGS. 2 and 3, in an optical tape drive comprising a plurality of optical heads (12) for writing data in a plurality of tracks (18) on an optical tape (20), each track (18) having an off-track threshold (22), a system is shown for off-track write prevention and/or data recovery. The system may comprise a plurality of actuators (14'), each actuator (14') configured to control a position of one of the plurality of optical heads (12) associated therewith. The system may further comprise a controller (26') configured to determine a position of each of the optical heads (12) relative to an associated track (18) on the optical tape (20) and to prevent, in response to an event causing at least one of the plurality of optical heads (12) to have a position outside the off-track threshold (22) of the associated track (18), only that optical head or heads (12) from writing data to the optical tape (20) and to buffer a stream of data for that optical head or heads (12) for later processing.

As previously described, the event may be a disturbance external to the optical tape drive and/or motion of the optical tape (20) in a direction substantially lateral to a direction of tape travel (shown by arrow (B)). Moreover, the controller (26') may be further configured to permit, in response to the event, an optical head (12) to write data to the optical tape (20) as long as the optical head (12) has a position within the off-track threshold (22) of the associated track (18).

The optical tape drive may further comprises a plurality of optical heads (12) for reading data from a plurality of tracks (18) on the optical tape (20), each track (18) having an off-track threshold (22). In that regard, the optical heads (12) may be configured for both writing data to and reading data from the tape media (20). The controller (26') may be configured to permit, in response to an event causing at least one of the plurality of optical read heads (12) to have a position outside the off-track threshold (22) of the associated track (18), the read head or heads (12) to stream data when a loss of data from the read head or heads (12) is correctable according to the ECC design provided.

The controller (26') may also be further configured to identify a defect (30) in one of the plurality of tracks (18) on the optical tape (20) and to generate a signal for use in controlling the actuator (14') associated with the optical head (12) writing data to or reading data from the track (18) having the defect (30) to move the optical head (12) from the track (18) having the defect (30) to a position for reading data from another one of the plurality of tracks (18) on the optical tape (20). The controller (26') may be further configured to identify a failure of a first one of the plurality of optical heads (12') and to generate a signal for use in controlling an actuator (14') associated with a second one of the plurality of optical heads (12) to move the second optical head (12) to a position for reading data from or writing data to the track (18) associated with the failed first optical head (12').

Figure 4:
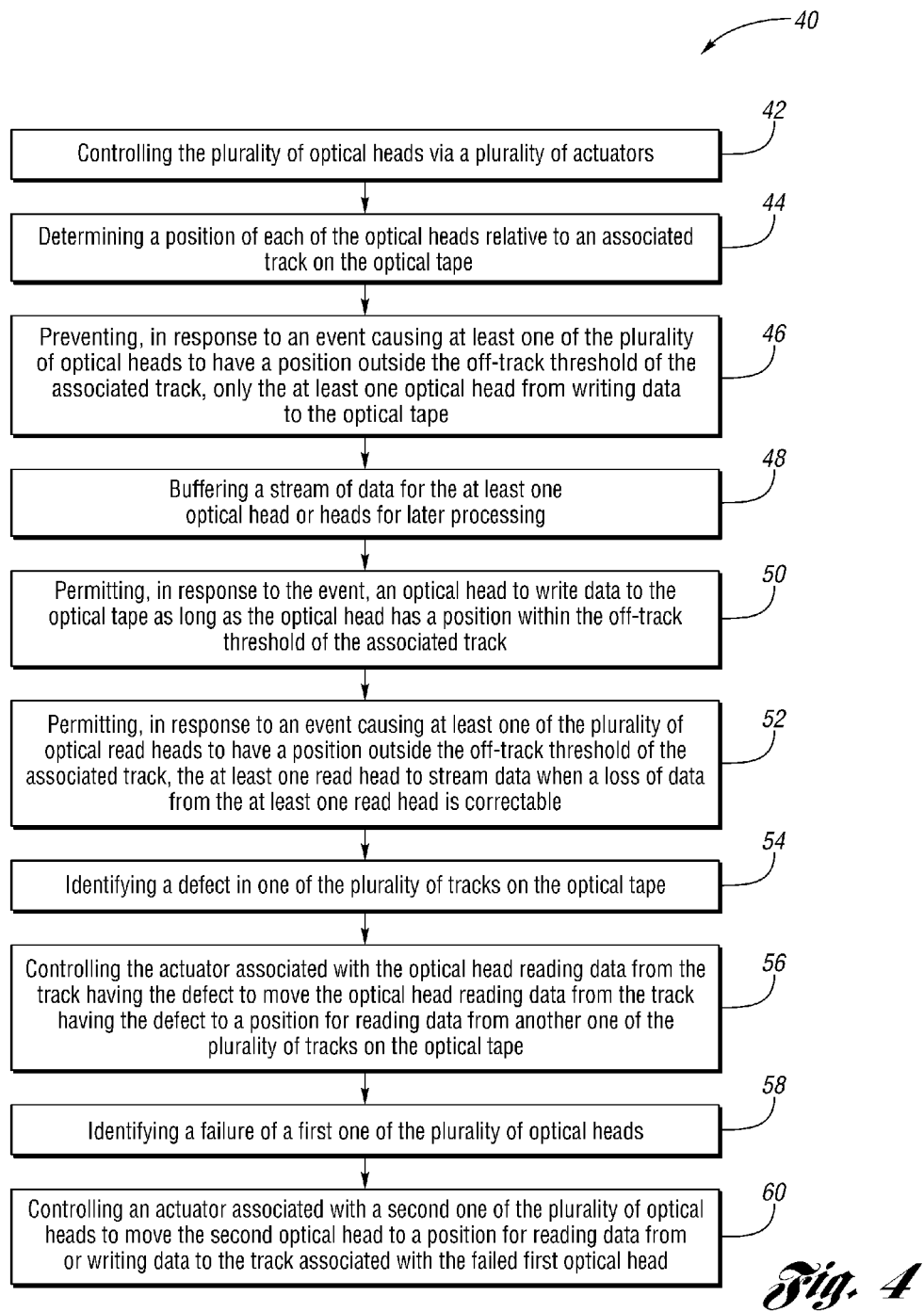
FIG. 4 is a simplified flowchart depicting an embodiment of a method for off-track write prevention and/or data recovery as described herein.

Referring now to FIG. 4, a simplified flowchart is shown that depicts an embodiment of a method for off-track write prevention and/or data recovery as described herein. More specifically, in an optical tape drive comprising a plurality of optical heads for writing data in a plurality of tracks on an optical tape, each track having an off-track threshold, a method (40) is illustrated for off-track write prevention. The method (40) may comprise controlling (42) the plurality of optical heads via a plurality of actuators, each actuator configured to control a position of one of the plurality of optical heads associated therewith, and determining (44) a position of each of the optical heads relative to an associated track on the optical tape. The method (40) may further comprise preventing (46), in response to an event causing at least one of the plurality of optical heads to have a position outside the off-track threshold of the associated track, only that optical head or heads from writing data to the optical tape.

The method (40) may also comprise buffering (48) a stream of data for that optical head or heads for later processing. As previously described, the event comprises a disturbance external to the optical tape drive and/or motion of the optical tape in a direction substantially lateral to a direction of tape travel. The method (40) may further comprise permitting (50), in response to the event, an optical head to write data to the optical tape as long as the optical head has a position within the off-track threshold of the associated track.

As previously described, the optical tape drive may alternatively or further comprise a plurality of optical heads for reading data from a plurality of tracks on the optical tape, each track having an off-track threshold. Once again, in that regard, the optical heads may be configured for both writing data to and reading data from the optical tape media. In such an embodiment, the method (40) may alternatively or further comprise permitting (52), in response to an event causing at least one of the plurality of optical read heads to have a position outside the off-track threshold of the associated track, that read head or heads to stream data when a loss of data from that read head or heads is correctable according to the ECC design provided.

Still further, the method (40) may also comprise identifying (54) a defect in one of the plurality of tracks on the optical tape, and controlling (56) the actuator associated with the optical head reading data from the track having the defect to move the optical head reading data from the track having the defect to a position for reading data from another one of the plurality of tracks on the optical tape. The method (40) may also comprise identifying (58) a failure of a first one of the plurality of optical heads, and controlling (60) an actuator associated with a second one of the plurality of optical heads to move the second optical head to a position for reading data from or writing data to the track associated with the failed first optical head.

Thus, in an optical tape drive system, according to the system and method described herein, only the heads outside their associated OT threshold limits are prevented from processing data, and associated data may be buffered for later processing. Thus, the data transfer rate of the device and the media capacity are only marginally impacted in comparison to the case where all heads are disabled for a period of time and all data is written later. Accordingly, a smaller buffer size and lower number of sequential flushing are required for streaming data, thereby providing for a higher data transfer rate and greater media capacity.

As is apparent from the foregoing description, an improved system and method are provided for off-track write prevention and data recovery in an optical tape drive having multiple optical heads. The system and method overcome performance limitations associated with excessive external disturbances to optical heads or excessive instantaneous tape lateral motion to provide greater data transfer rates overall and increased data capacity.

While certain embodiments of a system and method for managing keys for use in encrypting and decrypting data in a technology stack have been illustrated and described herein, they are exemplary only and it is not intended that these embodiments illustrate and describe all those possible. Rather, the words used herein are words of description rather than limitation, and it is understood that various changes may be made without departing from the spirit and scope of the following claims.

What is claimed is:

1. In an optical tape drive comprising a plurality of optical heads for reading data from a plurality of tracks on an optical tape, each track having an off-track threshold, a method for off-track data recovery comprising:
    controlling the plurality of optical heads via a plurality of actuators, each actuator configured to control a position of one of the plurality of optical heads associated therewith;
    determining a position of each of the optical heads relative to an associated track on the optical tape; and
    permitting, in response to an event causing at least one of the plurality of optical heads to have a position outside the off-track threshold of the associated track, the at least one optical head to stream data read from the optical tape when a loss of data from the at least one head is correctable.

2. The method of claim 1 wherein the event comprises a disturbance external to the optical tape drive.

3. The method of claim 1 wherein the event comprises motion of the optical tape in a direction substantially lateral to a direction of tape travel.

4. The method of claim 1 further comprising:
    identifying a defect in one of the plurality of tracks on the optical tape; and
    controlling the actuator associated with the optical head reading data from the tracking having the defect to move the optical head reading data from the track having the defect to a position for reading data from another one of the plurality of tracks on the optical tape.

5. The method of claim 1 further comprising:
    identifying a failure of a first one of the plurality of optical heads; and
    controlling an actuator associated with a second one of the plurality of optical heads to move the second optical head to a position for reading data from the track associated with the failed first optical head.

6. In an optical tape drive comprising a plurality of optical heads for writing data in a plurality of tracks on an optical tape, each track having an off-track threshold, a method for off-track write prevention comprising:
    controlling the plurality of optical heads via a plurality of actuators, each actuator configured to control a position of one of the plurality of optical heads associated therewith;
    determining a position of each of the optical heads relative to an associated track on the optical tape;
    preventing, in response to an event causing at least one of the plurality of optical heads to have a position outside the off-track threshold of the associated track, only the at least one optical head from writing data to the optical tape; and
    buffering a stream of data for the at least one optical head for later processing.

7. The method of claim 6 wherein the event comprises a disturbance external to the optical tape drive.

8. The method of claim 6 wherein the event comprises motion of the optical tape in a direction substantially lateral to a direction of tape travel.

9. The method of claim 6 further comprising permitting, in response to the event, an optical head to write data to the optical tape as long as the optical head has a position within the off-track threshold of the associated track.

10. The method of claim 6 wherein the optical tape drive further comprises a plurality of optical heads for reading data from a plurality of tracks on the optical tape, each track having an off-track threshold, the method further comprising permitting, in response to an event causing at least one of the plurality of optical read heads to have a position outside the off-track threshold of the associated track, the at least one read head to stream data when a loss of data from the at least one read head is correctable.

11. The method of claim 10 wherein the event comprises a disturbance external to the optical tape drive.

12. The method of claim 10 wherein the event comprises motion of the optical tape in a direction substantially lateral to a direction of tape travel.

13. The method of claim 10 further comprising:
    identifying a defect in one of the plurality of tracks on the optical tape; and
    controlling the actuator associated with the optical head reading data from the tracking having the defect to move the optical head reading data from the track having the defect to a position for reading data from another one of the plurality of tracks on the optical tape.

14. The method of claim 10 further comprising:
    identifying a failure of a first one of the plurality of optical heads; and
    controlling an actuator associated with a second one of the plurality of optical heads to move the second optical head to a position for reading data from the track associated with the failed first optical head.

* * * * *

UNITED STATES PATENT AND TRADEMARK OFFICE
CERTIFICATE OF CORRECTION

PATENT NO. : 8,811,131 B2
APPLICATION NO. : 14/050884
DATED : August 19, 2014
INVENTOR(S) : Mahnad It is certified that error appears in the above-identified patent and that said Letters Patent is hereby corrected as shown below:

In the Specification

In column 5, line 14, delete "am" and insert -- an --, therefor.

Signed and Sealed this
Seventeenth Day of March, 2015

Michelle K. Lee
*Director of the United States Patent and Trademark Office*